Oct. 20, 1925.
Re. 16,187
J. SOSS
HINGE
Original Filed June 23, 1922
Fig. 1,
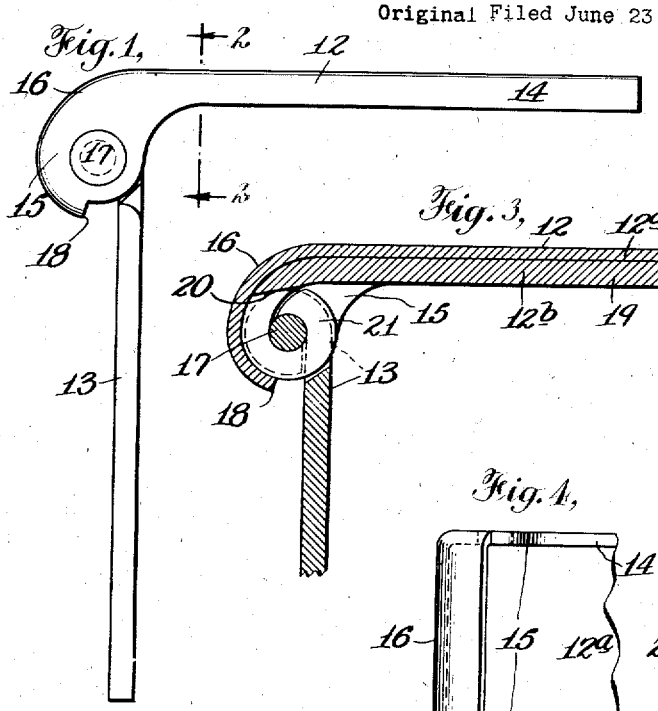
Fig. 2,
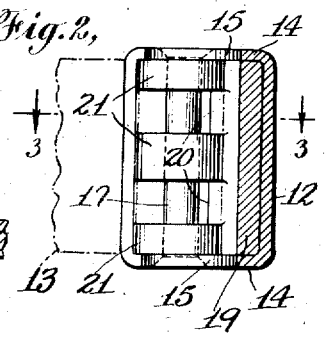
Fig. 3,
Fig. 4,
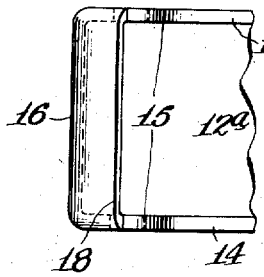
Fig. 5,
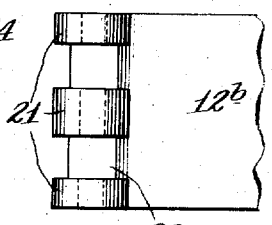
Fig. 6,
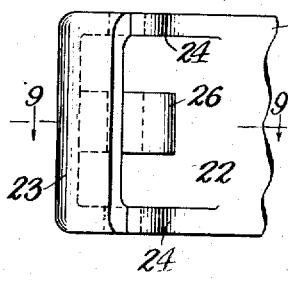
Fig. 7,
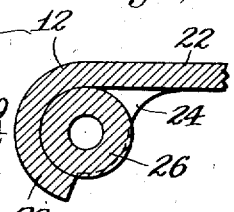
INVENTOR
Joseph Soss
BY
Howard C. Thompson
ATTORNEY Reissued Oct. 20, 1925.

Re. 16,187

UNITED STATES PATENT OFFICE.

JOSEPH SOSS, OF BROOKLYN, NEW YORK.

HINGE.

Original No. 1,477,193, dated December 11, 1923, Serial No. 570,446, filed June 23, 1922. Application for reissue filed May 10, 1924. Serial No. 712,460.

*To all whom it may concern:*

Be it known that I, JOSEPH SOSS, a citizen of the United States, and residing at Brooklyn, in the county of Kings and State of New York, have invented certain new and useful Improvements in Hinges, of which the following is a specification, such as will enable those skilled in the art to which it appertains to make and use the same.

This invention relates to hinges and particularly to devices of this class, the separate butts of which are composed of sheet metal fashioned to the desired form to give the required strength and rigidity to the separate butts of the hinge; and the object of the invention is to provide a hinge of the class specified, one of the butts of which is composed of one or more metallic parts fashioned to the desired form and to receive the other of said hinge butts; a further object being to so form that portion of the hinge butts which are joined or connected by the usual pivot pin as to produce the greatest possible strength in said hinge butts where joined; and with these and other objects in view the invention consists in a hinge of the class and for the purpose specified which is simple in construction, efficient in use and which is constructed as hereinafter described and claimed.

The invention described and claimed herein is an improvement on that shown and described in prior patents granted to me December 28, 1920, and bearing Numbers 1,363,371 and 1,363,372 respectively, and is fully disclosed in the following specification, of which the accompanying drawing forms a part, in which the separate parts of my improvement are designated by suitable reference characters in each of the views, and in which:—

Fig. 1 is a plan view of one form of my improved hinge showing the separate butts in an extended position;

Fig. 2 a partial section on the line 2—2 of Fig. 1 with one of the hinge butts omitted;

Fig. 3 a partial section on the line 3—3 of Fig. 2;

Fig. 4 a side face view of one part of one of the hinge butts shown in Figs. 1 to 3 inclusive;

Fig. 5 a similar view of the other part of said hinge butt;

Fig. 6 is a similar view to Fig. 4 but showing another modification; and

Fig. 7 a partial section on the line 9—9 of Fig. 6.

In Figs. 1 to 5 inclusive, I have shown one form of my improved hinge, and in said figures I have shown at 12 one butt of the hinge and at 13 the other butt thereof, said butts being of any desired form and construction and as shown in the accompanying drawing, the butt 12 is composed of an outer sheet metal casing portion $12^a$ and an inner core and filler portion $12^b$ which may, if desired, also be composed of sheet metal and which is secured to the part $12^a$ by riveting, brazing, welding or in any other desired manner.

The part $12^a$ of the hinge butt 12 is of substantial channel formation in cross section or provided with top and bottom flanges 14, and these flanges are enlarged as shown at 15 at the curved end 16 of the butt 12 to form bearings for a suitable pivot pin 17 in the usual manner, and the rounded or curved portion 16 of the butt 12 is cut away as shown at 18.

The part $12^b$ of the butt 12 in the construction shown is also composed of sheet metal and the shank portion 19 thereof is preferably of such thickness as to fill the channel formed by the flnges 14 of the part $12^a$, and the end of the part $12^b$ which fits within the curved portion 16 of the part $12^a$ is fashioned to conform with the part $12^a$ and is cut out as shown at 20 to form three ring-like bearing members 21, two of which are located beneath the enlarged portions 15 of the flanges 14 and the other of which is located centrally of the curved end 16 of the hinge butt 12, as clearly shown in Fig. 2 of the drawing, and the pin 17 is adapted to pass through the bearings 21 as clearly shown in said figure. The part $12^b$ serves to reinforce and strengthen the part $12^a$ and particularly to reinforce and strengthen that portion of the hinge butt 12, or the part $12^a$ thereof, through which the pin 17 is passed. The other hinge butt 13 is provided with ears adapted to encircle the pin 17 between the separate bearings 21 as indicated in dotted lines in Fig. 2 of the drawing. It will be understood that while the part $12^b$ of the hinge butt is shown as composed of sheet metal that the same may be formed in any desired manner.

In Figs. 6 and 7 of the drawing, I have shown the hinge butt 12 formed in the same general manner as shown in Fig. 4 of the drawing, and in which I provide an independent bearing member 26 which is placed centrally of the curved portion 23 and secured thereto by welding, brazing or in any other desired manner.

As hereinbefore stated I am not necessarily limited to any specific shape or form of the body portion of the hinge butts 12 and 13, nor to the manner in which said body portions are formed, and various changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. A hinge of the class described, one of the butts of which is composed of a sheet metal shell or facing member provided with a curved end, a core or filler member for said first named member and conforming with the general shape of said first named member and that portion of said last named member within the curved end portion of the first named member being provided with independent bearing members adapted to receive the usual pivot pin for joining the separate butts of the hinge together.

2. A hinge of the class described, one of the butts of which is composed of a sheet metal shell or facing member provided with a curved end, a core or filler member for said first named member and conforming with the general shape of said first named member and secured thereto to form a part thereof, said last named member being composed of sheet metal and that portion thereof within the curved end portion of the first named member being cut out and fashioned to form substantial circular bearing members for the usual pivot pin for joining the separate butts of the hinge together.

3. A hinge of the class described, one of the butts of which is composed of a sheet metal shell or facing member provided with a curved end, a core or filler member for said first named member and conforming with the general shape of said first named member and secured thereto to form a part thereof, said last named member being composed of sheet metal and that portion thereof within the curved end portion of the first named member being cut out and fashioned to form substantially circular bearing members for the usual pivot pin for joining the separate butts of the hinge together, and said first named member being provided with parts adapted to cooperate with a number of the bearings of said last named member.

4. A hinge butt of the class described comprising a body portion one end of which is fashioned to form a substantially semi-circular hollow portion having top and bottom walls through which the usual pivot pin is adapted to pass, and means for reinforcing the semi-circular hollow portion of the hinge butt comprising a member formed independent of said hinge butt and secured thereto.

5. A hinge butt of the class described comprising a body portion one end of which is fashioned to form a substantially semi-circular hollow portion having top and bottom walls through which the usual pivot pin is adapted to pass, and means for reinforcing the semi-circular hollow portion of the hinge butt comprising a tubular bearing member formed independent of and secured to said hinge butt.

6. A hinge butt of the class described comprising a body portion one end of which is fashioned to form a substantially semi-circular hollow portion having top and bottom walls through which the usual pivot pin is adapted to pass, means for reinforcing the semi-circular hollow portion of the hinge butt comprising a member formed independent of said hinge butt and secured thereto, and that portion of said member which extends into the hook-shaped end of the body portion being divided into separate bearing members.

7. A hinge butt of the class described comprising a body portion composed of sheet metal, said body portion being substantially U-shaped in form in cross section and provided with a hook-shaped end portion having top and bottom walls, and a sheet metal member mounted in the channel of said body and secured thereto and provided within said hook-shaped end portion with independent bearing members.

8. In a hinge having a pair of hinge members provided with interengaging knuckles connected together by a pivot pin, a cover plate channelled to receive one of said hinge members, which channel is provided at the outer end with a hood which encloses the hinge joint.

9. In a hinge having a pair of hinge members pivoted together at one end, an independent cover plate channelled to receive both hinge members when folded together, which channel is closed at the outer end forming a pocket which substantially encloses the hinge joint.

10. In a hinge comprising a pair of hinge members pivoted together at one end, a cover plate secured to one of said members having a hood at the outer end to enclose the hinge joint.

11. In a hinge comprising a pair of hinge members pivoted together, a channel cover plate carried by one of said members, the channel of which is closed at the outer end to form a pocket which encloses the hinge joint 12. In a hinge comprising a pair of hinge members pivoted together at one end, a cover plate secured to one of said members having a hood at the outer end to enclose the hinge joint and a side flange to overlap the hinge member to which it is secured.

13. In a hinge comprising a pair of hinge members pivoted together at one end, a cover plate secured to one of said members having a hood at the outer end to enclose the hinge joint, said hood having a side wall continued to form a flange to overlap the edge of the hinge member to which the cover plate is secured.

14. A hinge butt composed of two independent sheet metal members arranged with predetermined faces in juxtaposition and permanently secured together.

15. A hinge butt composed of two independent sheet metal members, one of said members forming a cover plate for the other and both of said members being curved at one end of the butt.

16. A hinge butt composed of two independently formed members, one of said members constituting a hinge member and provided with a pivot portion and the other of said members provided with a hood substantially covering the pivot portion of the first-named member.

17. A hinge butt comprising a sheet metal hinge member provided with a pivot portion, a cover plate for said member having a hood to cover the pivot portion of said member and a side flange to overlap said member.

18. A hinge butt comprising a member having a hood at one end and means formed independent of said member and secured thereto for re-enforcing the hood and providing a bearing for a pivot pin.

In testimony that I claim the foregoing as my invention I have signed my name this 9th day of May, 1924.

JOSEPH SOSS.